United States Patent
Li et al.

(10) Patent No.: US 11,432,208 B2
(45) Date of Patent: Aug. 30, 2022

(54) NETWORK HANDOVER METHOD, APPARATUS AND SYSTEM

(71) Applicant: ZTE Corporation, Guangdong (CN)

(72) Inventors: Zhendong Li, Guangdong (CN); Jinguo Zhu, Guangdong (CN)

(73) Assignee: ZTE CORPORATION, Shenzen (CN)

( * ) Notice: Subject to any disclaimer, the term of this patent is extended or adjusted under 35 U.S.C. 154(b) by 5 days.

(21) Appl. No.: 16/568,230

(22) Filed: Sep. 11, 2019

(65) Prior Publication Data
US 2020/0022031 A1 Jan. 16, 2020

Related U.S. Application Data

(63) Continuation of application No. PCT/CN2018/095842, filed on Jul. 16, 2018.

(30) Foreign Application Priority Data

Aug. 2, 2017 (CN) .......................... 201710652890.8

(51) Int. Cl.
*H04W 36/00* (2009.01)
*H04W 36/38* (2009.01)

(52) U.S. Cl.
CPC ... *H04W 36/0022* (2013.01); *H04W 36/0044* (2013.01); *H04W 36/385* (2013.01)

(58) Field of Classification Search
CPC ......... H04W 36/0022; H04W 36/0044; H04W 36/385; H04W 36/00; H04W 36/14; H04W 36/0016
See application file for complete search history.

(56) References Cited

U.S. PATENT DOCUMENTS

| | | | | |
|---|---|---|---|---|
| 2019/0191346 A1* | 6/2019 | Han | ..................... | H04B 7/0695 |
| 2019/0191349 A1* | 6/2019 | Kim | ..................... | H04W 76/18 |
| 2020/0267617 A1* | 8/2020 | Larsen | ................. | H04L 69/322 |

FOREIGN PATENT DOCUMENTS

| | | |
|---|---|---|
| CN | 105144787 A | 12/2015 |
| CN | 106465215 A | 2/2017 |
| WO | 2017/062244 A1 | 4/2017 |
| WO | 2019/011107 A1 | 1/2019 |

OTHER PUBLICATIONS

Extended European Search Report dated Jan. 8, 2020 for European Application No. 18840902.3, filed on Jul. 16, 2018 (8 pages).

(Continued)

*Primary Examiner* — Dady Chery
(74) *Attorney, Agent, or Firm* — Perkins Coie LLP

(57) ABSTRACT

Disclosed in embodiments of the present disclosure are a network handover method, apparatus and system. The method includes: a first network element instructing a source base station connected to a user equipment (UE) to initiate a handover during establishment of traffic for the UE; and a second network element initiating bearer establishment or Quality of Service (QoS) flow establishment after the UE has been handed over from a first access network to a second access network. With the embodiments of the present disclosure, a technical problem of an over-complicated handover between networks in the related art is solved.

15 Claims, 10 Drawing Sheets

(56) References Cited

OTHER PUBLICATIONS

3GPP, 3rd Generation Partnership Project; Technical Specification Group Services and System Aspects; Procedures for the 5G System; Stage 2 (Release 15), TS 23.502 V0.5.0, 148 pages, Jul. 2017.
Ericsson, "23.502: 5GC-EPC interworking," SA WG2 Meeting #119, Dubrovnik, Croatia, S2-170805, 6 pages, Feb. 2017.
ZTE, "Discussion on EPS/RAT fallback scenario and solution," SA WG2 Meeting #122bis, Sophia Antipolis, France, S2-175477, 4 pages, Aug. 2017.
Huawei, "Handover procedure from 4G to 5G in Single Registration mode," SA WG2 Meeting #121, S2-173296, Hangzhou, China, 8 pages, May 2017.
NTT DOCOMO, "TS 23.502: Nx-based Handover procedure," SA WG2 Meeting #119, S2-171503, Dubrovnik, Croatia, 10 pages, Feb. 2017.
International Search Report and Written Opinion dated Oct. 11, 2018 for International Application No. PCT/CN2018/095842, filed on Jul. 16, 2018 (8 pages).
Communication under Rule 71(3) EPC dated Jan. 14, 2021, for European Application No. 18840902.3, filed on Jul. 16, 2018 (5 pages).
Japanese Office Action dated Feb. 24, 2021 for Japanese Patent Application No. 2020-505249, filed on Jul. 16, 2018 (7 pages).
Korean Office Action dated Jan. 12, 2021 for Korean Patent Application No. 10-2020-7005521, filed on Jul. 16, 2018 (6 pages).
Notification to Grant dated Jan. 12, 2021 for Chinese Patent Application No. 201710652890.8, filed on Aug. 2, 2017 (2 pages).
Korean Notice of Allowance of Patent dated Jul. 1, 2021 for Korean Patent Application No. 10-2020-7005521, filed on Jul. 16, 2018 (6 pages).
Samsung, "TP for PDU Session Setup and Release Related Procedures," 3GPP TSG-RAN WG3 NR AdHoc, Qingdao, China, R3-172247 10 pages, Jun. 27-29, 2017.

* cited by examiner

NETWORK HANDOVER METHOD, APPARATUS AND SYSTEM

CROSS REFERENCE TO RELATED APPLICATIONS

This patent document is a continuation of and claims the benefit of priority to International Patent Application No. PCT/CN2018/095842, filed on Jul. 16, 2018, which claims the benefit of priority to Chinese Patent Application No. 201710652890.8, filed on Aug. 2, 2017. The entire contents of the before-mentioned patent applications are incorporated by reference as part of the disclosure of this application.

TECHNICAL FIELD

The present disclosure relates to the field of communications, and specifically, to a network handover method, apparatus and system.

BACKGROUND

The 3rd Generation Partnership Project (3GPP) has been developing a fourth-generation (or referred to Long Term Evolution (LTE)) mobile communication system from Release8 (R8). The network architecture is as shown in FIG. 1. FIG. 1 is a diagram of an evolved packet core (EPC) architecture in the related art of the present disclosure. The functions of network elements in the architecture are described below.

A terminal (e.g. user equipment (UE)) is accessed to the 4G network and obtains traffic mainly via a radio air interface. The UE interacts with a base station via the air interface, and interacts with a mobility management entity (MME) in a core network via non-access-stratum (NAS) signaling.

A base station (e.g. eNB in a radio access network (RAN)) is responsible for radio resource scheduling and radio connection management of a network to which the UE is accessed to.

The MME is a core network control plane entity, and is mainly responsible for user authentication, authorization and subscription checking, UE mobility management, connection and bearer management of the packet data network (PDN-), paging triggering in a user IDLE state, and other functions.

A serving gateway (GW) is a user plane function entity of a core network, and is mainly responsible for an interaction with a PDN GW in the case of roaming.

The PDN GW (P-GW) is a user plane function entity of a core network and an access point which is used for the UE to access the PDN, is responsible for user Internet Protocol (IP) address allocation, and the establishment, modification and deletion of bearer which is triggered by network. The P-GW also has Quality of Service (QoS)-related charging control and other functions, and is the anchor point of the UE in the 3GPP system, and thus the IP address is ensured to be unchanged and traffic continuity is ensured. In an architecture in which the control and the forwarding are separated, the P-GW is further divided into two parts. One is a control entity PGW-C, and the other is a user plane entity PGW-U. The PGW-C is responsible for signaling control and the PGW-U is responsible for IP forwarding.

A home subscription server (HSS) stores subscription information of the user.

A policy and charging control function (PCRF) is responsible for formulating policy decisions and charging rules. The PCRF provides network control rules based on traffic data flows. The network control includes detection, gating control, and QoS control of the traffic data flow, a charging rule based on data flows, and the like. The PCRF transmits the policies and charging rules formulated by the PCRF itself to the P-GW for execution.

The 3GPP began researching a NextGen system from Release 14 (R14). The NextGen system may support three types of traffic: evolved mobile broadband (eMBB), massive machine type communication (mMTC), and ultra reliable machine type communication (uMTC), which have different network characteristics. FIG. 2 is a schematic diagram of an architecture of the NextGen mobile communication network in the related art of the present disclosure, and the function of each network element is described below.

The UE is accessed to the network and obtains traffic mainly via a NextGen wireless air interface. The UE interacts with a base station via the air interface, and interacts with a common control plane function and a session control plane function in the core network via the NAS signaling.

A new generation base station (NG radio access network (RAN)) is responsible for the radio resource scheduling and radio connection management of the network to which the UE is accessed to. The NG RAN base station may adopt a new radio access technology (gNB) or an evolved LTE technology (eLTE).

A session management function (SMF) interacts with the UE, and is mainly responsible for establishment, modification and deletion requests of user packet data unit (PDU) session, selecting user plane functions, establishing a user plane connection between the UE and a user plane function (UPF), determining QoS parameters of the session together with a policy control function (PCF), and the like.

An access and mobility control function (AMF) is a common control plane function in the core network. A user has only one AMF. The one AMF is responsible for user authentication, authorization, and subscription checking to ensure that a user is a legitimate user. The UE mobility management includes location registration and temporary identity allocation. When the user initiates a PDU connection establishment request, an appropriate SMF is selected, the NAS signaling between the UE and the SMF is forwarded, and access stratum (AS) signaling between the base station and the SMF is forwarded.

The user plane function (UPF) provides user plane processing functions, including data forwarding and QoS execution. When users move, the UPF also provides user plane anchor points to ensure traffic continuity.

The policy control function (PCF) provides the authorization function of resources, which is very similar to the PCRF of the 4G era.

A unified data management (UDM) function stores subscription data of the user, which is similar to the HSS of the 4G era.

The NextGen system (5GS) will begin to be deployed locally in hotspots such as downtown and commercial centers. If the UE is accessed to the 5G system, as the user moves outside of the coverage of the 5G system, the user's UE is handed over to the 4G system.

FIG. 3 is a network architecture supporting a bidirectional handover between 4G and 5G in the related art of the present disclosure. A core feature is that the architecture is simultaneously compatible with both 4G and 5G architectures. Another core feature is a combination of the PGW-C and the SMF, a combination of the PGW-U and the UPF, and a combination of the PCF and the PCRF, and the user plane of the UE is always anchored on the UPF/PGW-U. An Nx interface is added between the AMF and the MME, and an inter-system handover request is sent via the interface. In this way, when the UE is handed over between LTE and 5G, a seamless handover can be ensured.

In the 4G system, a PDN connection is established between the UE and the network, and includes one default bearer and multiple dedicated bearers. Each bearer includes services flows and corresponding QoS parameters. In the 5G system, a PDU session is established between the UE and the network, and the PDU session incudes one default QoS flow and multiple dedicated QoS flows. Each QoS flow includes service flows and corresponding QoS parameters, such as a QoS profile and a packet filter.

The handover from 5G system to the 4G system, that is, the PDU session established in the 5G system is transferred to the PDN connection in the 4G system. And the QoS flow in the PDU session is converted to a bearer in the 4G system, and vice-versa.

FIG. 4 is a flowchart of a handover from 5G to 4G in the related art of the present disclosure, and will be briefly introduced below.

In step 100, a UE has established a PDU session and probably has established dedicated QoS flow(s) in the 5G system.

In step 101, a source 5G RAN node finds that the UE needs to be handed over to 4G, and transmits a handover request to an AMF, where information of a target cell is carried.

In step 102, the AMF requests PDN context information corresponding to the 4G from a SMF.

In step 103, the AMF selects a target MME and transmits a forward relocation request.

In step 104, the MME transmits a create session request to a serving gateway (S-GW).

In step 105, the MME transmits a handover request to an eNB for radio resources.

In step 106, after receiving a response from the eNB, the MME transmits a forward relocation response to the AMF.

In step 107, the AMF transmits a handover command to the 5G RAN node, and the 5G NG RAN node transmits the handover command to the UE.

In step 108, the UE is accessed to the 4G system and transmits a handover complete message to the eNB.

In step 109, the eNB transmits a handover notify message to the MME.

In steps 110 to 114, a modify bearer request is initiated by the MME to the S-GW and then sent by the S-GW to a P-GW, and finally a user plane is established.

In step 115, the UE performs a tracking area update (TAU) procedure over the 4G system.

FIG. 5 is a flowchart of a handover from 4G to 5G in the related art of the present disclosure, including steps described below.

In step 200, a UE has established a PDN connection and probably also has established dedicated bearer(s) in the 4G system.

In step 201, a source 4G RAN node (eNB) finds that the UE needs to be handed over to 5G, and transmits a handover request to a MME, where information of a target cell is carried.

In step 202, according to the handover request, the MME selects a target AMF, and transmits a forward relocation request to the AMF.

In step 203, the AMF requests 5G session information from a SMF.

In step 204, the AMF transmits a handover request to a 5G RAN for reserving resources.

In step 205, according to the information of the 5G RAN, the AMF updates the session.

In step 206, the AMF returns a forward relocation response to the MIME.

In step 207, the MME transmits a handover command to the eNB, and the eNB transmits the handover command to the UE, and the handover command includes radio information of the target 5G RAN node.

In step 208, the UE is accessed to the target 5G RAN node and transmits a handover complete message to the target 5G RAN node.

In step 209, the 5G (NG) RAN node transmits a handover notify message to the AMF.

In steps 210 to 212, the AMF notifies the SMF that the handover is complete and the SMF modifies the user plane.

In step 213, the UE initiates a registration procedure in the 5G system.

In addition, when the gNB and the eLTE base station are simultaneously accessed to the 5G core network, a cross-access handover can occur. In this case, the handover may be regarded as a handover within the 5G system, and will not be described again.

In an early stage of the 5G system deployment, some service is not suitable for being provided on 5G base stations, such as IP multimedia subsystem (IMS) voice. At this time, if the UE is accessed to the gNB, the UE needs to return to the 4G for providing the voice service (VoLTE), or the UE needs to return to the eLTE base station for providing the voice service.

FIG. 6 is a schematic diagram of an implementation mode of a circuit switched fallback (CSFB) in a 3GPP system in the related art of the present disclosure. The CSFB in the related art includes the steps described below.

In step 301, a UE receives a session initiation protocol (SIP) Invite request. (For a calling case, this step is ignored.)

In step 302, the UE transmits an extended service request (SR) to a NG RAN node. (For a calling case, when the UE initiates a call, this step is triggered.)

In step 303, the NG RAN node forwards the extended service request (SR) to an AMF.

In step 304, the UE is handed over to 4G via a packet-switched (PS) handover (HO).

In step 305, for a called scenario, the UE transmits a SIP 183 response to an IMS in 4G.

In step 305a, for a calling scenario, the UE initiates a SIP Invite request in the 4G system.

In step 306, the establishment of the IMS session is completed between the UE and a remote end.

In the process of the related art, the network and the UE are greatly needed to be enhanced, and need to know that the other party has such capability. The UE needs to know that although the base station does not support a certain service, the UE can be handed over to the base station/network supporting this service when this traffic is initiated. The network needs to know that the user can trigger the extended service request when the traffic is performed so that the user can be handed over to the target network/base station. For the called scenario, when the UE receives an application layer message, underlying signaling (i.e. NAS signaling) needs to be triggered. This cross-layer trigger is very difficult for a third-party application (App).

In view of the above problem in the related art, no effective solution has yet been proposed.

SUMMARY

Embodiments of the present disclosure provide a network handover method, apparatus and system to at least solve a technical problem of an over-complicated handover between networks in the related art.

An embodiment of the present disclosure provides a network handover method. The method includes: instructing, by a first network element, a source base station connected to a user equipment (UE) to initiate a handover during establishment of traffic for the UE; and initiating, by a second network element, bearer establishment or Quality of Service (QoS) flow establishment after the UE has been handed over from a first access network to a second access network.

Another embodiment of the present disclosure provides a network handover system including a first network element and a second network element. The first network element includes: a determining module, which is configured to, during establishment of traffic for a user equipment (UE), determine that the traffic is to be established in a second access network; and an instructing module, which is configured to instruct a source base station connected to the UE to initiate a handover during the establishment of the traffic for the UE. The second network element includes: an initiating module, which is configured to initiate bearer establishment or Quality of Service (QoS) flow establishment after the UE has been handed over from a first access network to the second access network.

Another embodiment of the present disclosure further provides a network handover apparatus applied to a session management function (SMF), including: a receiving module, which is configured to receive a request for a user equipment (UE) for at least one of the following traffic in a first access network: a new Quality of Service (QoS) rule and a session modification request; a determining module, which is configured to determine that the traffic is to be established in a second access network; and a transmitting module, which is configured to transmit a request for a handover to the second access network to a base station of the first access network through an access and mobility control function (AMF).

Another embodiment of the present disclosure further provides another network handover apparatus applied to a gNB, including: a first receiving module, which is configured to receive an N2 session request transmitted by a session management function (SMF), where the N2 session request carries Quality of Service (QoS) information of a first access network; a first transmitting module, which is configured to transmit an N2 session response to the SMF through an access and mobility control function (AMF); and a second transmitting module, which is configured to transmit a handover required message to the AMF, where the handover required message carries information of a target cell.

Another embodiment of the present disclosure further provides another network handover apparatus applied to a gNB, including: a receiving module, which is configured to receive a first handover request for a handover from a first access network to a second access network; and a transmitting module, which is configured to transmit a second handover request for a handover from the first access network to the second access network to an access and mobility control function (AMF) according to the handover request. The gNB is applied to the first access network.

Another embodiment of the present disclosure further provides a storage medium. The storage medium is configured to store program codes for executing the following steps: instructing a source base station connected to a user equipment (UE) to initiate a handover during establishment of traffic for a UE; and initiating bearer establishment or Quality of Service (QoS) flow establishment after the UE has handed over from a first access network to a second access network.

Another embodiment of the present disclosure further provides a processor. The processor is configured to execute programs, which, when executed, execute the method of any one of the embodiments described above.

Another embodiment of the present disclosure further provides an electronic apparatus, including a memory and a processor. The memory is configured to store computer programs and the processor is configured to execute the computer programs for executing the method of any one of the embodiments described above.

With the embodiments of the present disclosure, during the establishment of traffic for a UE, the first network element instructs the source base station connected to the UE to initiate a handover; and after the UE has been handed over from the first access network to the second access network, the second network element initiates bearer establishment or QoS flow establishment. With the newly provided network handover mode, the technical problem of an over-complicated handover between networks in the existing art is solved, and the handover is implemented with few changes to the UE and the network. Thus, the network handover process is improved and simplified.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described in detail with reference to the drawings in conjunction with the embodiments. It is to be noted that if not in collision, the embodiments and features thereof in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
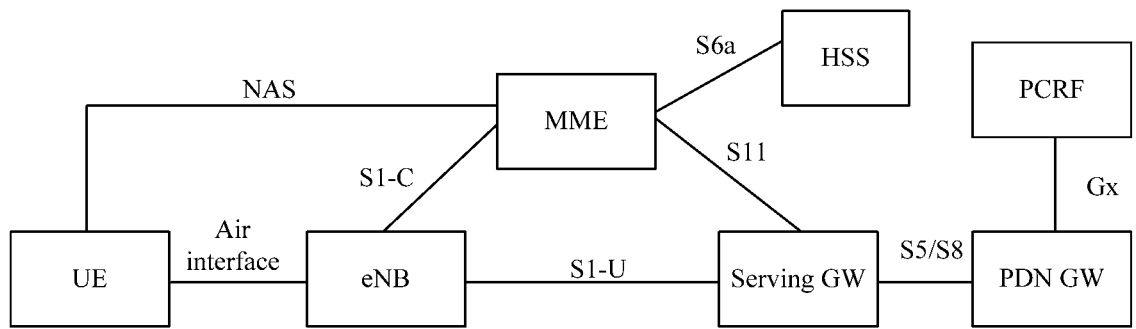
FIG. 1 is a diagram of an architecture of the EPC in the related art of the present disclosure.
Figure 2:
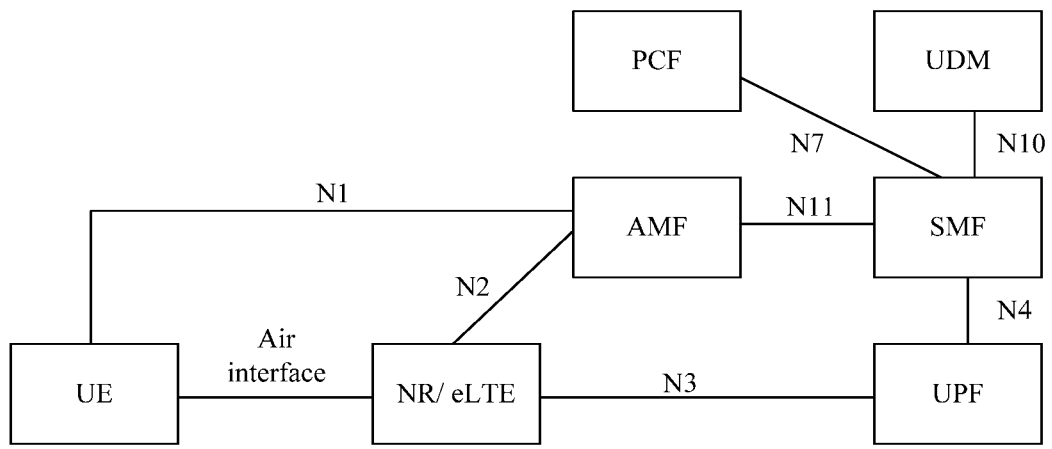
FIG. 2 is a schematic diagram of an architecture of a NextGen mobile communication network in the related art of the present disclosure.
Figure 3:
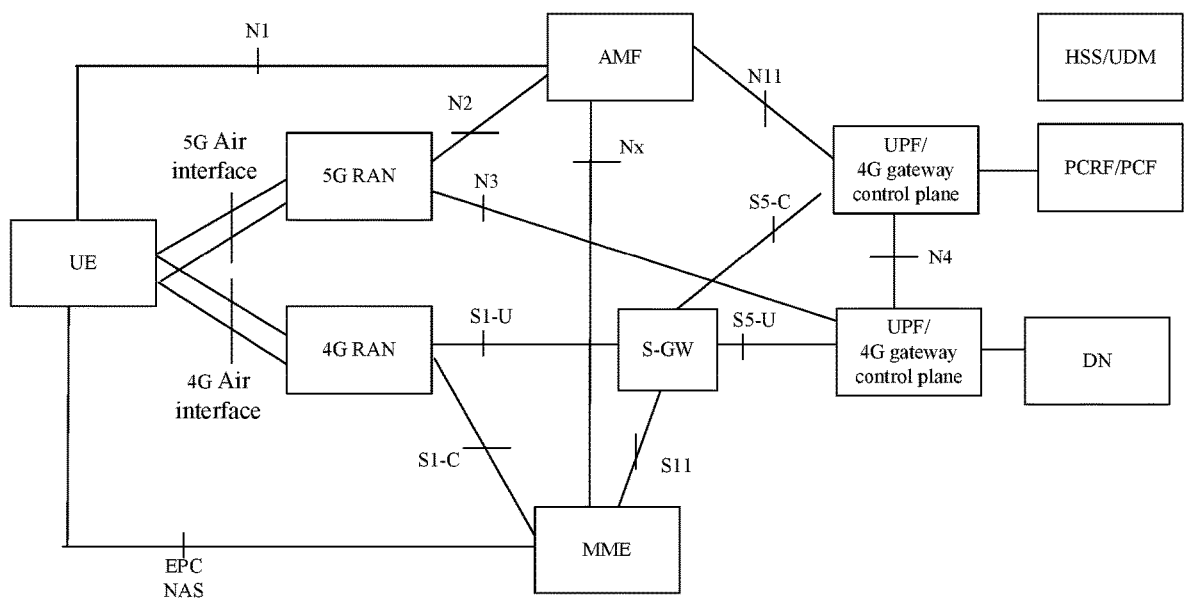
FIG. 3 shows a network architecture supporting a bidirectional handover between 4G and 5G in the related art of the present disclosure.

The embodiment of the present application may be run on a network architecture shown in FIG. 3.

Figure 7:
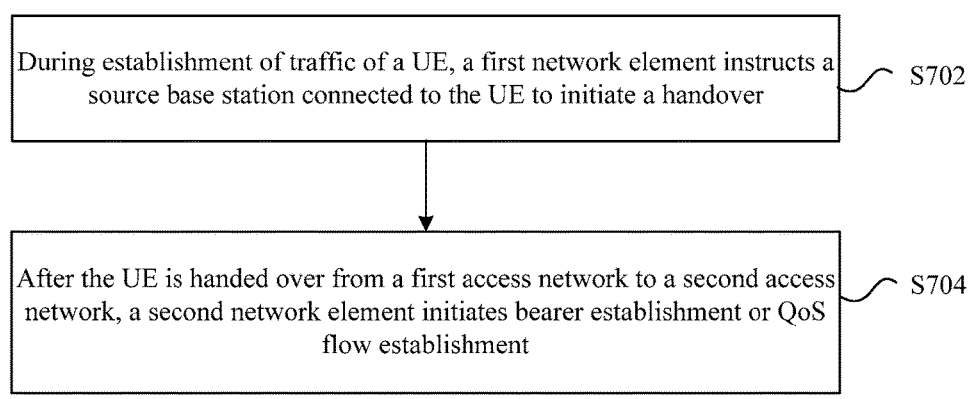
FIG. 7 is a flowchart of a network handover method according to an embodiment of the present disclosure.

The embodiment of the present application provides a network handover method executed on the network architecture described above. FIG. 7 is a flowchart of the network handover method according to the embodiment of the present disclosure. As shown in FIG. 7, the method includes the steps described below.

In step 702, during establishment of traffic for a UE, a first network element instructs a source base station connected to the UE to initiate a handover.

In step 704, after the UE is handed over from a first access network to a second access network, a second network element initiates bearer establishment or QoS flow establishment.

Through the steps described above, during the establishment of the traffic for the UE, the first network element instructs the source base station connected to the UE to initiate a handover, and after the UE is handed over from the first access network to the second access network, the second network element initiates the bearer establishment or the QoS flow establishment. With the newly provided network handover method, the technical problem of an over-complicated handover between networks in the related art is solved, and changes to the UE and the network are few while the handover is implemented. Thus, the network handover process is improved and simplified.

In an exemplary embodiment, the first network element (execution body of the steps described above) includes at least one of: a session management function (SMF), an access and mobility control function (AMF), a mobility management entity (MME), and a base station of the first access network. When the first network element is the MME, a second network element node is the SMF; or when the first network element is one of: the SMF, the AMF and the base station of the first access network, the second network element node is a PGW-C or the SMF. However, the present disclosure is not limited thereto.

In an exemplary embodiment, during the establishment of the traffic for the UE, the step in which the first network element instructs the source base station connected to the UE to initiate the handover includes at least one of the steps described below.

When an establishment request is received, the first network element instructs the source base station connected to the UE to initiate a handover, where the establishment request refers to a request name received by the base station and correspondingly the first network element refers to the base station.

When a new QoS profile is received, the first network element instructs the source base station connected to the UE to initiate a handover.

When a resource establishment request is received, the first network element instructs the source base station connected to the UE to initiate a handover.

When a session modification request is received, the first network element instructs the source base station connected to the UE to initiate a handover, where the session modification request refers to a request name received by the SMF/PGW-C and correspondingly the first network element refers to the SMF.

In the embodiment, the base station of the first access network includes at least one of: a gNB (5G base station), an evolved Long Term Evolution (eLTE) base station and an LTE base station.

The solution in the embodiment may be triggered and completed on different network element entities. The solution will be described below with respect to different scenarios.

When the first network element is the SMF, the step in which the first network element instructs the source station connected to the UE to initiate a handover includes the steps described below.

In step S11, the SMF determines that traffic is to be established in the second access network.

In step S12, the SMF transmits a request for a handover to the second access network to the base station of the first access network through the AMF.

When the first network element is the AMF, the step in which the first network element instructs the source station connected to the UE to initiate a handover includes the steps described below.

In step S21, the AMF receives a session request sent by the SMF, where the session request carries QoS information of the first access network.

In step S22, the AMF transmits an N2 session request to the first access network, where the N2 session request carries an indication for a handover to the second access network.

In step S23, the AMF receives a handover required message sent by the first access network, where the handover required message carries information of a target cell.

The AMF transmits an N2 session response to the SMF.

When the first network element is a base station that is in the first access network and connected to the UE, the step in which the first network element instructs the source station connected to the UE to initiate a handover includes the steps described below.

In step S31, the base station of the first access network receives an N2 session request sent by the SMF, where the N2 session request carries QoS information of the first access network.

In step S32, the base station of the first access network transmits an N2 session response to the SMF through the AMF.

In step S33, the base station of the first access network transmits a handover required message to the AMF, where the handover request carries information of the target cell.

When the first network element is a base station that is in the first access network and connected to the UE, the step in which the first network element instructs the source station connected to the UE to initiate a handover includes the steps described below.

In step S41, the base station of the first access network receives an N2 session request sent by the SMF, where the N2 session request carries QoS information of the first access network.

In step S42, the base station of the first access network transmits a handover required message to the AMF, and the AMF transmits an N2 session response to the SMF, where the handover request carries information of the target cell.

When the first network element is the MME, the step in which the first network element instructs the source station connected to the UE to initiate a handover includes the steps described below.

In step S51, the MME receives a create bearer request sent through a S-GW by a PGW-C.

In step S52, the MME determines that a service corresponding to the create bearer request is to be established in the second access network.

In step S53, the MME transmits a request for a handover to the second access network to the base station of the first access network.

In an exemplary embodiment, the N2 session response described in the above scenario carries information for indicating that the UE is handed over to the second access network.

In the embodiment, the first access network is a new radio (NR) access network, and the second access network is a Long Term Evolution (LTE) access network; or the first access network is the LTE access network and the second access network is the NR access network.

In the embodiment, a SMF-C and the PGW-C are collocated network elements and may have internal interaction with each other. Examples are given as below.

When the first network element is the SMF and when the UE is handed over to the second network, how does the second network element PGW-C know to establish a bearer in the second network? The answer is that the SMF and the PGW-C are collocated network elements and the SMF-C internally notifies the PGW-C, so after the handover is completed, the PGW-C will initiate bearer establishment.

When the first network element is the AMF, or the gNB, they notify the SMF, in the response message, that the UE is handed over to the second network. The SMF and the second network element PGW-C are collocated network elements and the SMF internally notifies the PGW-C, so after the handover is completed, the PGW-C initiates bearer establishment.

Alternatively, when the first network element is the AMF, or the gNB, the SMF knows that the handover occurs because the handover occurs in bearer establishment or QoS flow establishment in the source network. The SMF and the second network element PGW-C are the collocated network elements and the SMF internally notifies the PGW-C, so after the handover is completed, the PGW-C initiates bearer establishment.

When the MME is the first network element, the MME should notify the PGW-C in a step (in which the MME transmits a create bearer response to the PGW-C through the S-GW, QoS flow establishment on a target side is instructed in the create bearer response), and then the UE is handed over to the second network. The PGW-C and the second network element SMF are collocated network elements and the PGW-C internally notifies the SMF, so after the handover is completed, the SMF initiates QoS flow establishment.

From the description of the embodiments described above, it will be apparent to those skilled in the art that the method of any embodiment described above may be implemented by software plus a necessary general-purpose hardware platform, or may of course be implemented by hardware, but in many cases, the former is a preferred implementation mode. Based on this understanding, the solutions provided by the present disclosure substantially, or the part of the solutions contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method according to each embodiment of the present disclosure.

Embodiment 2

An embodiment of the present disclosure further provides a network handover system for implementing the above-mentioned embodiments and preferred embodiments. What has been described will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 8:
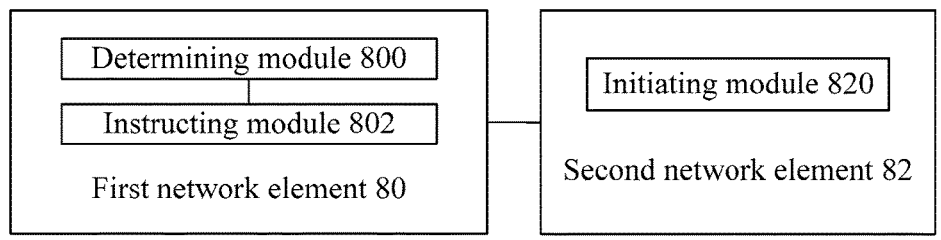
FIG. 8 is a structural block diagram of a network handover system according to an embodiment of the present disclosure.

FIG. 8 is a structural block diagram of a network handover system according to an embodiment of the present disclosure. As shown in FIG. 8, the system includes: a first network element 80 and a second network element 82.

The first network element 80 includes a determining module 800 and an instructing module 802.

The determining module 800 is configured to, during establishment of traffic for a UE, determine that the traffic is to be established in a second access network.

The instructing module 802 is configured to instruct a source base station connected to the UE to initiate a handover during the establishment of the traffic for the UE.

The second network element 82 includes: an initiating module 820, which is configured to initiate bearer establishment or Quality of Service (QoS) flow establishment after the UE is handed over from a first access network to the second access network.

In an exemplary embodiment, the instructing module 802 includes at least one of: a first instructing unit, which is configured to instruct the source base station connected to the UE to initiate a handover when a create bearer request is received; a second instructing unit, which is configured to instruct the source base station connected to the UE to initiate a handover when a new QoS profile is received; a third instructing unit, which is configured to instruct the source base station connected to the UE to initiate a handover when a resource establishment request is received; and a fourth instructing unit, which is configured to instruct the source base station connected to the UE to initiate a handover when a session modification request is received.

In an exemplary embodiment, the first network element 80 includes at least one of: a session management function (SMF), an access and mobility control function (AMF), a mobility management entity (MME), and a base station of the first access network.

In an exemplary embodiment, the base station of the first access network includes at least one of: a gNB, an evolved Long Term Evolution (eLTE) and an LTE base station.

In an exemplary embodiment, the second network element 82 includes: a core network element of the second access network.

According to different application scenarios in the embodiment, when the first network element 80 is the SMF, the instructing module 802 is configured to transmit a request for a handover to the second access network to the base station of the first access network through the AMF.

When the first network element 80 is the AMF, the instructing module 802 is configured to: receive a session request sent by the SMF, where the session request carries QoS information of the first access network; transmit an N2 session request to the first access network, where the N2 session request carries an indication for a handover to the second access network; receive a handover required message sent by the first access network, where the handover required message carries information of the target cell; and transmit an N2 session response to the SMF.

When the first network element 80 is a base station in the first access network and connected to the UE, the instructing module 802 is configured to: receive an N2 session request sent by the SMF, where the N2 session request carries QoS information of the first access network; transmit an N2 session response to the SMF through the AMF; and transmit a handover required message to the AMF, where the handover required message carries information of the target cell.

When the first network element 80 is a base station in the first access network and connected to the UE, the instructing module 802 is configured to: receive an N2 session request sent by the SMF, where the N2 session request carries QoS information of the first access network; transmit a handover required message to the AMF, and the AMF transmits an N2 session response to the SMF, where the handover required message carries information of the target cell.

When the first network element 80 is the MME, the determining module 800 is configured to: receive a create bearer request transmitted through a S-GW by a PGW-C, and determine that a service corresponding to the create bearer request is to be established in the second access network; and the instructing module 802 is configured to transmit a request for a handover to the second access network to the base station of the first access network.

Alternatively, in the embodiment, the first access network is a new radio (NR) access network, and the second access network is a Long Term Evolution (LTE) access network; or the first access network is the LTE access network and the second access network is the NR access network.

In an exemplary embodiment, when the first network element 80 is the MME, the second network element 82 node is the SMF; or when the first network element 80 is one of: the SMF, the AMF and the base station of the first access network, the second network element 82 node is a PGW-C or the SMF.

In an exemplary embodiment, the N2 session response carries information for indicating that the UE is handed over to the second access network.

An embodiment of the present disclosure further provides a network handover apparatus applied to a SMF, including: a receiving module, which is configured to receive the request of a UE for at least one of following traffic in a first access network: a new QoS profile and a session modification request; a determining module, which is connected to the receiving module, and configured to determine that the traffic is to be established in a second access network; and a transmitting module, which is connected to the determining module, and configured to transmit a request for a handover to the second access network to a base station of the first access network through an AMF.

An embodiment of the present disclosure further provides another network handover apparatus applied to a gNB, including: a first receiving module, which is configured to receive an N2 session request transmitted by a SMF, where the N2 session request carries QoS information of a first access network; a first transmitting module, which is configured to transmit an N2 session response to the SMF through an AMF; and a second transmitting module, which is configured to transmit a handover required message to the AMF, where the handover required message carries information of a target cell. A radio bearer request has the same function as the N2 session request. When the N2 session request, which carries the QoS information, is received, that is, the base station needs to establish a radio bearer.

In an exemplary embodiment, the N2 session response carries information for indicating that the UE is handed over to the second access network.

An embodiment of the present disclosure further provides another network handover apparatus applied to a gNB, including: a receiving module, which is configured to receive a first handover request for a handover from a first access network to a second access network; and a transmitting module, which is configured to transmit a second handover request for a handover from the first access network to the second access network to an AMF according to the handover request; where the gNB is in the first access network.

It is to be noted that the various modules described above may be implemented by software or hardware. Implementation by hardware may, but may not necessarily, be performed in the following manner: the various modules described above are located in a same processor or different processors respective in any combination manner.

Embodiment 3

This embodiment is an optional embodiment of the present disclosure. A detailed description of the present application is given below in conjunction with specific implementation solutions.

The embodiment provides a method and system for a traffic fallback. During establishment of the traffic, a network node instructs a base station to initiate a handover when receiving a media plane establishment request, or receiving a new QoS profile, or receiving a resource establishment request. After being handed over to a second access network or a second base station, the network node initiates new QoS flow establishment or bearer establishment.

The embodiment includes multiple implementation modes as described below.

Figure 9:
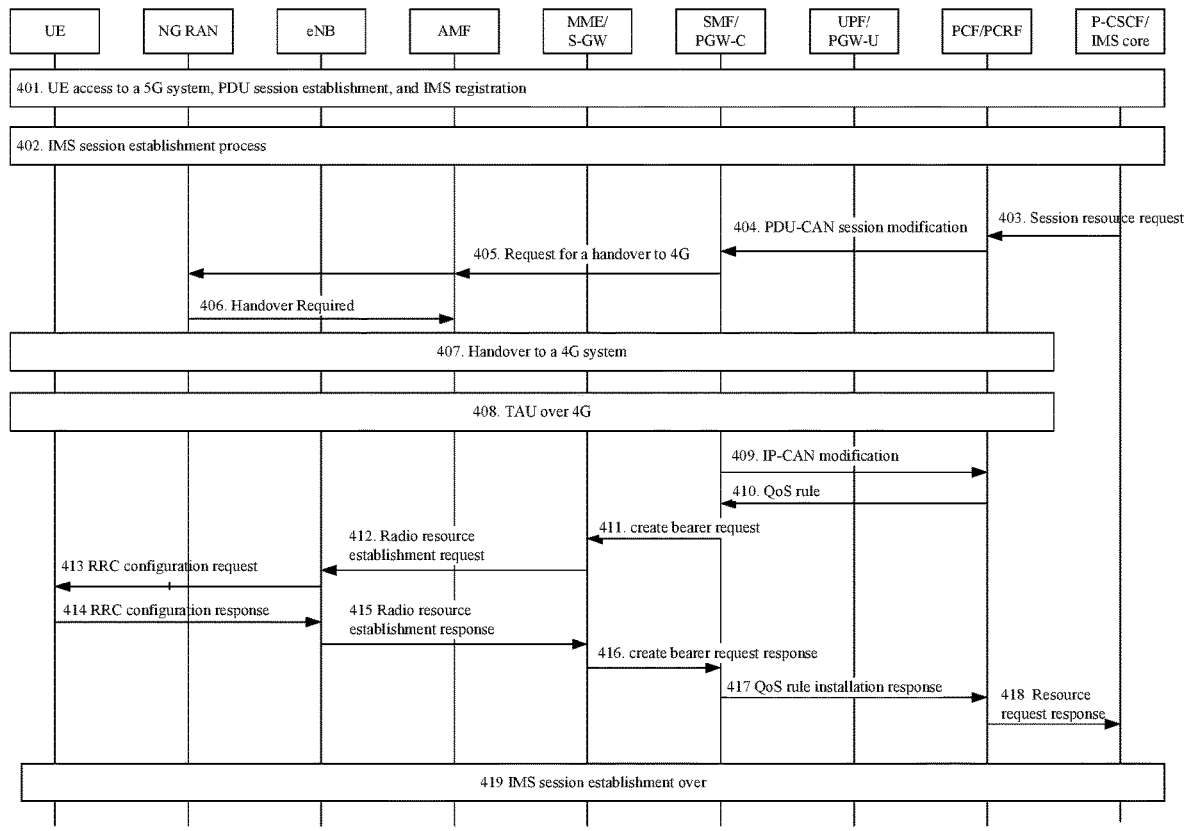
FIG. 9 is a flowchart of fallback form 5G to 4G triggered by a SMF in the present disclosure.

FIG. 9 is a flowchart of the fallback from 5G to 4G triggered by a SMF. The implementation mode of the fallback triggered by the SMF includes steps described below.

In step 401, a UE is accessed to a 5G system, a PDU session is established, and an IMS registration is also completed.

In step 402, IMS session establishment is started.

In step 403, a proxy-call session control function (P-CSCF) initiates a session resource authorization request to a PCF/PCRF.

In step 404, the PCF initiates a packet data unit connectivity access network (PDU-CAN) session modification request to the SMF, where the PDU-CAN session modification request includes a QoS profile, and alternatively, further includes QoS profile information used by a 4G system.

In step 405, the SMF judges that the traffic is to be established in a 4G network, and the SMF transmits a request for a handover to the 4G which is sent to a 5G RAN node through an AMF.

In step 406, the NG RAN transmits a handover required message to the AMF, where information of the target cell is carried.

Figure 4:
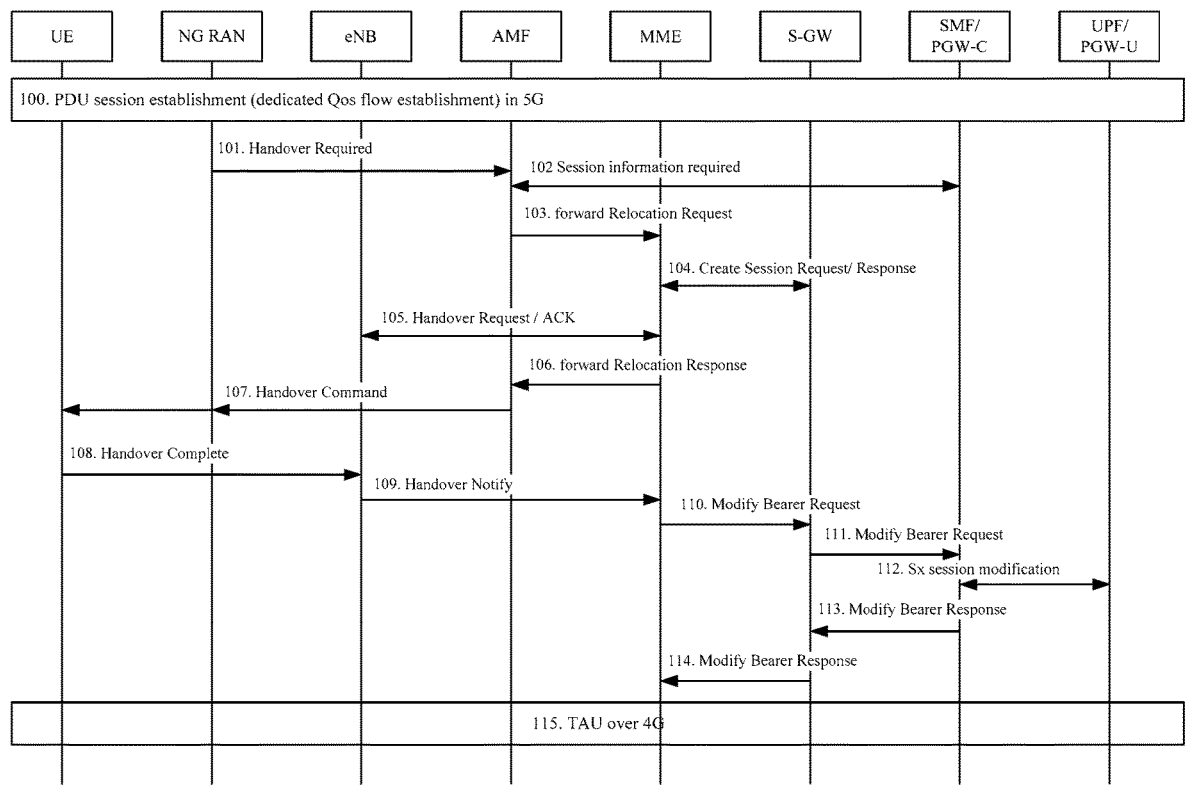
FIG. 4 is a flowchart of a handover from 5G to 4G in the related art of the present disclosure.

In step 407, the UE is handed over to the 4G, and the steps in the process are the same as the steps 102 to 114 of FIG. 4.

In step 408, after the handover is completed, the UE initiates a TAU process over the 4G system.

A PGW-C may also locally generate a QoS profile of the 4G system according to a 5G QoS profile, or may use the QoS profile of the 4G system provided in S404, or may take the steps 409 and 410 described below.

In step 409, the PGW-C initiates an IP-CAN session modification request to the PCRF.

In step 410, the PCRF returns a QoS profile of the 4G system to the PGW-C.

In the existing art, a process of the bearer establishment in a target network includes the steps described below.

In step 411, the PGW-C transmits a create session request to a S-GW, and the S-GW forwards the request to a MME, where the create session request carries the 4G QoS profile.

In step 412, the MME transmits a bearer setup request to an eNB.

In step 413, the eNB transmits a RRC reconfiguration request to the UE.

In step 414, the UE returns a RRC reconfiguration response.

In step 415, the eNB returns a bearer setup response to the MME.

In step 416, the MME returns a create session response to the S-GW, and the S-GW forwards the create session request response to the PGW-C.

In step 417, the PGW-C returns a QoS profile installation response to the PCRF.

In step 418, the PCRF returns a resource request response to the P-CSCF.

In step 419, the session establishment in the IMS is completed.

Figure 10:
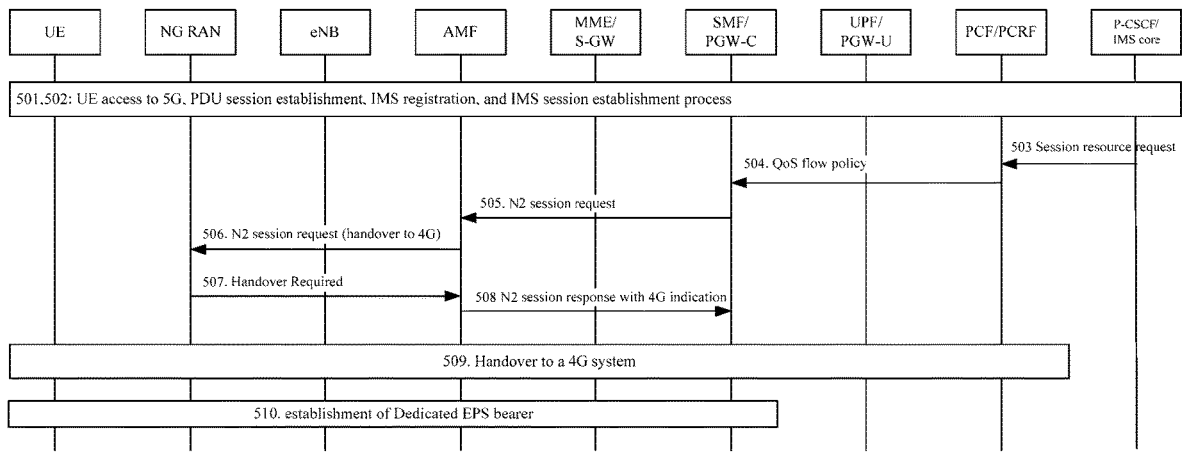
FIG. 10 is a flowchart of handover form 5G to 4G triggered by an AMF in the present disclosure.

FIG. 10 is a flowchart of handover from 5G to 4G triggered by an AMF in the present disclosure, and the implementation mode triggered by an AMF includes the following steps.

Steps 501 to 504 are the same as steps 401 to 404.

In step 505, a SMF transmits a session request to a 5G RAN node, where the session request carries information for QoS of 5G, and the message first arrives at an AMF.

In step 506, the AMF transmits an N2 session request to the 5G RAN node, where the N2 session request carries an indication for a handover to the 4G.

In step 507, the NG RAN transmits a handover required message to the AMF, and the handover request carries information of the target cell.

In step 508, the AMF transmits an N2 session response to the SMF, indicates the handover to the 4G and then establishes a bearer thereafter.

In step 509, the UE is handed over to the 4G, which is the same as in S407; and the UE may trigger a TAU process here (same as in S408).

In step 510, after the handover is completed, the PGW-C establishes a dedicated bearer in the 4G, which is the same as in steps 409 to 418, and subsequently session establishment in an IP Multimedia Subsystem (IMS) is completed.

Figure 11:
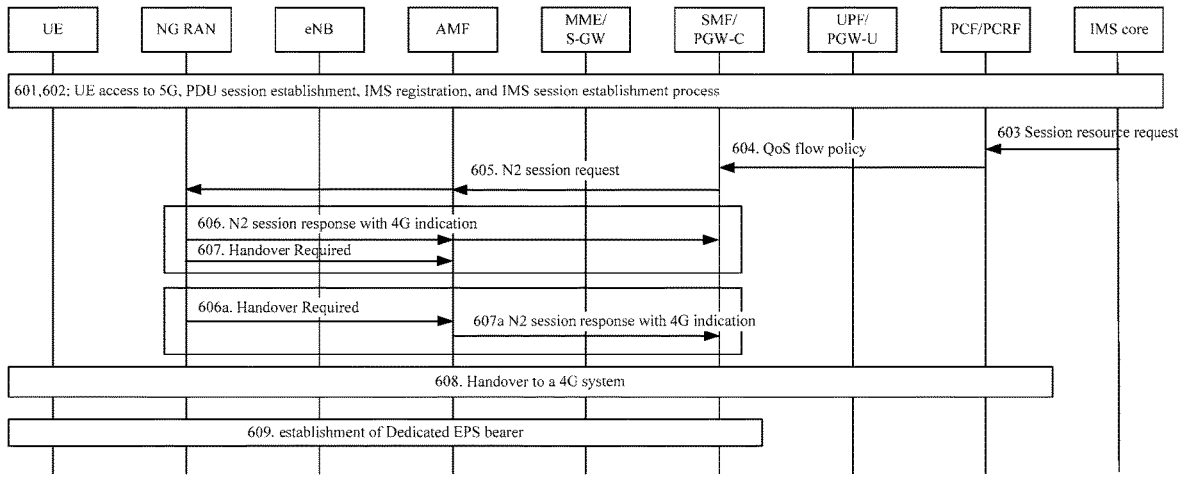
FIG. 11 is a flowchart of handover form 5G to 4G triggered by a NG RAN node according to an embodiment of the present disclosure.

FIG. 11 is a flowchart of the handover from 5G to 4G triggered by a NG RAN node according to an embodiment of the present disclosure. The implementation mode of the handover from 5G to 4G triggered by the NG RAN node includes the following steps.

Steps 601 to 604 are the same as steps 401 to 404.

In step 605, a SMF transmits an N2 session request to a 5G RAN node through an AMF, and the N2 session request carries 5G QoS parameters.

In step 606, the NG RAN transmits an N2 session response to the SMF through the AMF for indicating handover to the 4G.

In step 607, the NG RAN transmits a handover required message to the AMF, and the handover request carries information of the target cell.

The steps 606 and 607 described above may be replaced by the steps 606a and 607a described below.

In step 606a, the NG RAN transmits a handover required message to the AMF, and the handover request carries information of the target cell and an N2 session with an indication for a handover to the 4G.

In step 607a, the AMF transmits an N2 session response to the SMF, where handover to the 4G is indicated.

In step 608, the UE is handed over to the 4G, which is the same as in S407; and the UE may trigger a TAU process here (same as in S408).

In step 609, after the handover is completed, the PGW-C establishes a dedicated bearer in the 4G, which is the same as in steps 409 to 418, and subsequently session establishment is completed by the IMS.

Figure 12:
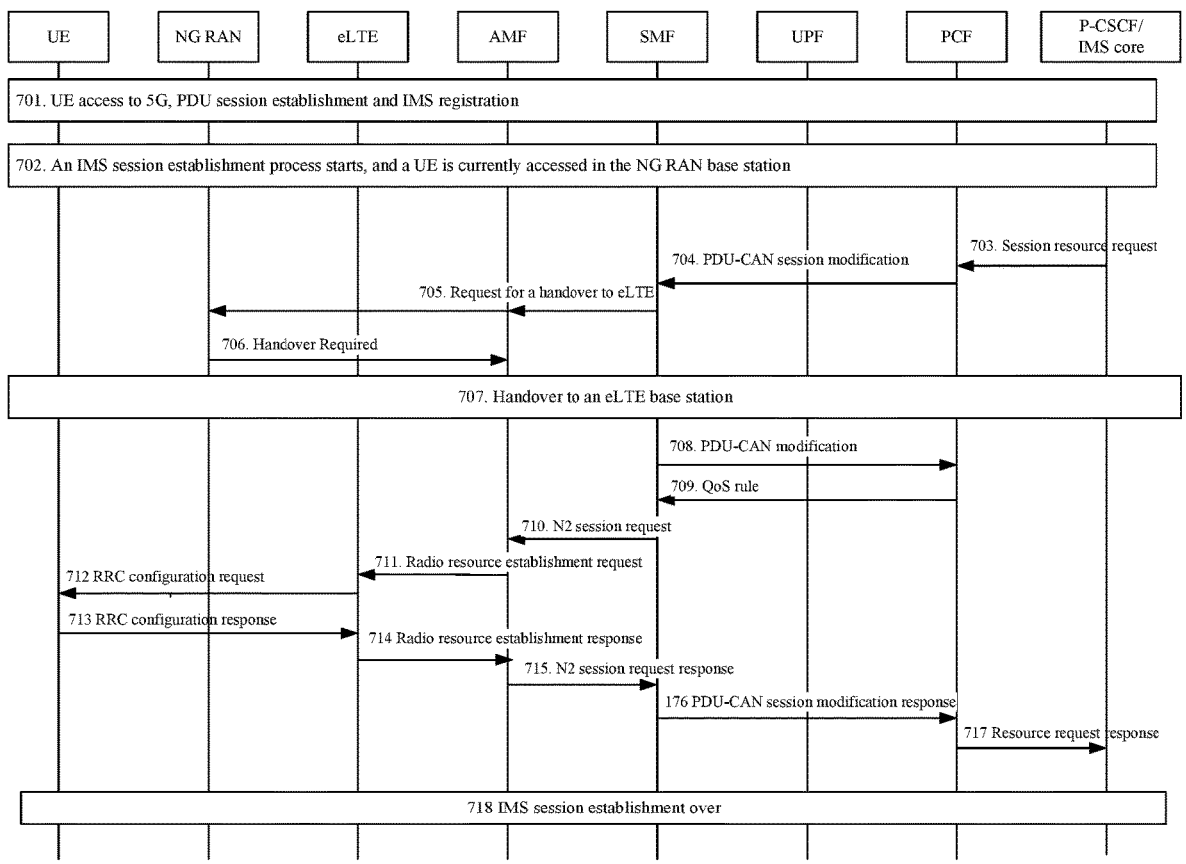
FIG. 12 is a flowchart of a process of a service falling back from NR to eLTE according to an embodiment of the present disclosure.

FIG. 12 is a flowchart of a process of traffic falling back from a NR to eLTE according to an embodiment of the present disclosure. In the 5G system, an implementation mode of the traffic falling back from the NR to eLTE is described below. Different from the previous figures, FIG. 12 shows that both the 5G RAN node and the eLTE base station are accessed to a 5G core network through an AMF. But the basic point of the invention is the same. When a QoS flow is established, the 5G RAN is handed over to the eLTE base station.

Steps 701 and 702 are the same as steps 401 and 402. In step S702, a base station to which a UE is currently accessed is the 5G RAN node.

In step 703, a P-CSCF initiates a session resource authorization request to a PCF.

In step 704, the PCF initiates a PDU-CAN session modification request to a SMF, and the PDU-CAN session modification request includes a QoS profile.

In step 705, the SMF determines that the traffic is to be established in the eLTE base station, and the SMF transmits a request for a handover to the eLTE base station to the 5G RAN node through the AMF.

In step 706, the NG RAN transmits a handover required message to the AMF, and the handover request carries information of the target eLTE cell.

In step 707, the UE is handed over to the eLTE base station, where a handover mode in the existing art may be adopted, and details are not described herein.

In steps 708 and 709, after the handover is completed, alternatively, the SMF may initiate a PDU-CAN session modification request to the PCF to obtain a new QoS profile.

A process of a QoS flow establishment in the eLTE in the 5G network in the existing art includes the steps described below.

In step 710, the SMF transmits an N2 session request to the AMF, and the N2 session request carries a QoS profile.

In step 711, the AMF transmits a radio resource establishment request to the eLTE base station.

In step 712, the eLTE transmits a RRC reconfiguration request to the UE.

In step 713, the UE returns a RRC reconfiguration response.

In step 714, the eLTE returns a radio resource establishment request response (i.e. N2 response) to the AMF.

In step 715, the AMF returns an N2 session request response to the SMF.

In step 716, the SMF returns a PDU-CAN session modification response to the PCF.

In step 717, the PCF returns a resource request response to the P-CSCF.

In step 718, the session establishment in the IMS is completed.

Figure 13:
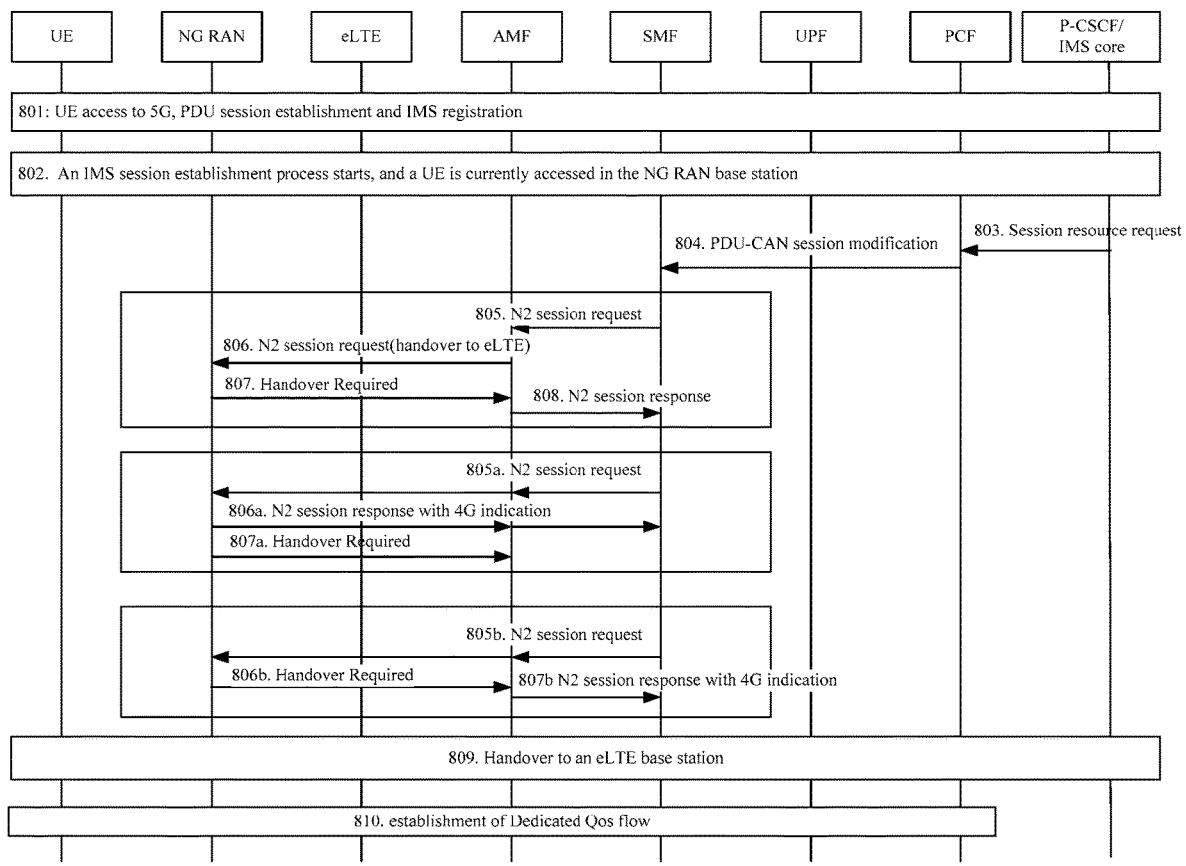
FIG. 13 is a flowchart of a process of a service in a 5G system falling back from NR to eLTE in the present disclosure.

FIG. 13 is a flowchart of traffic in the 5G system falling back from a NR to eLTE in the present disclosure. Another implementation mode of the fallback process of the traffic in the 5G system from the NR to the eLTE includes the following steps.

Steps 801 to 802 are the same as steps 701 to 702.

In step 803, a P-CSCF initiates a session resource authorization request to a PCF.

In step 804, the PCF initiates a PDU-CAN session modification request to a SMF, where the PDU-CAN session modification request carries a QoS profile.

Similar to FIGS. 10 and 11, there are three implementations below: steps 805~808; steps 805a~807a; steps 805b~807b.

In step 805, the SMF transmits a session request to a 5G RAN node, where the session request carries information for requiring 5G QoS, and the message first arrives at an AMF.

In step 806, the AMF transmits an N2 session request to the 5G RAN node, where an indication for a handover to the eLTE base station is carried.

In step 807, the NG RAN transmits a handover required message to the AMF, where information of the target cell of the eLTE base station is carried.

In step 808, the AMF transmits an N2 session response to the SMF, instructs the handover to the eLTE, and then establishes a QoS flow.

Or,

In step 805a, the SMF transmits an N2 session request to a 5G RAN node through an AMF, where the N2 session request carries 5G QoS parameters.

In step 806a, the NG RAN transmits an N2 session response to the SMF through the AMF, where the N2 session response instructs handover to the eLTE.

In step 807a, the NG RAN transmits a handover required message to the AMF, where information of the target cell of the eLTE base station is carried.

Or,

In step 805b, the SMF transmits an N2 session request to a 5G RAN through an AMF, where the N2 session request carries 5G QoS parameters.

In step 806b, the NG RAN transmits a handover required message to the AMF, where the handover request carries information of the target cell and an N2 session with an indication for a handover to the eLTE.

In step 807b, the AMF transmits an N2 session response to the SMF, indicates the handover to the eLTE, and then establishes a QoS flow.

In step 809, the UE is handed over to the eLTE base station.

In step 810, after the handover is completed, the QoS flow is established in the eLTE in the 5G network, and the IMS session establishment is completed. The steps are the same as steps 709 to 718.

Figure 14:
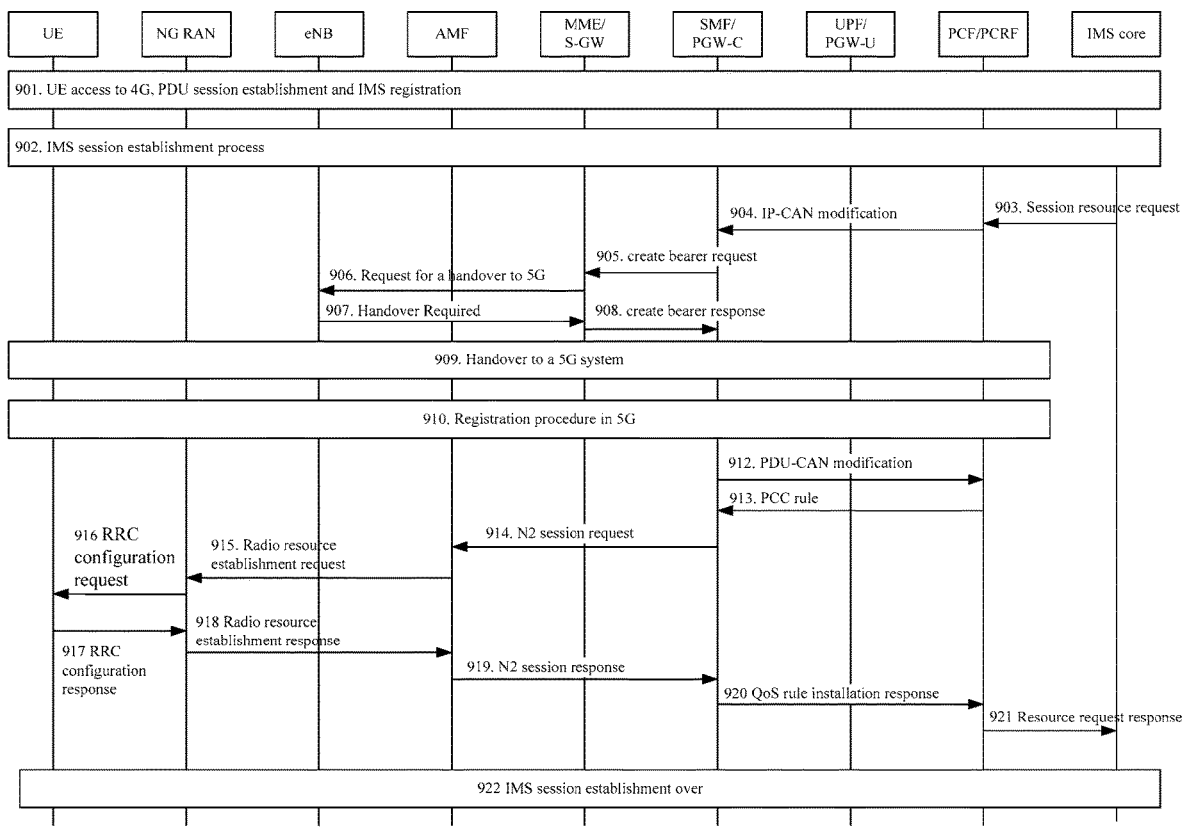
FIG. 14 is a flowchart of upgrading a service from 4G to 5G according to an embodiment of the present disclosure.

FIG. 14 is a flowchart of upgrading traffic from 4G to 5G according to an embodiment of the present disclosure. An implementation mode of upgrading traffic from 4G to 5G includes the following steps.

In step 901, a UE is accessed to the 4G, a PDN connection is established, and an IMS registration is executed.

In step 902, IMS session establishment is started.

In step 903, a P-CSCF initiates a session resource authorization request to a PCF/PCRF.

In step 904, the PCRF initiates an IP-CAN session modification request to a PGW-C, where the IP-CAN session modification request includes a QoS profile, and alternatively, the IP-CAN session modification request may further include information of QoS profile used by a 5G system.

In step 905, the PGW-C transmits a create bearer request to a S-GW, and the S-GW transmit the request to a MME.

In step 906, the MME determines that the traffic is to be established in the 5G network, and transmits a request for a handover to the 5G to an eNB.

In step 907, the eNB transmits a handover required message to the MME, where information of 5G target cell is carried.

In step 908, the MME transmits a create bearer response to the PGW-C through the S-GW, where the create bearer response instructs QoS flow establishment on a target side.

Figure 5:
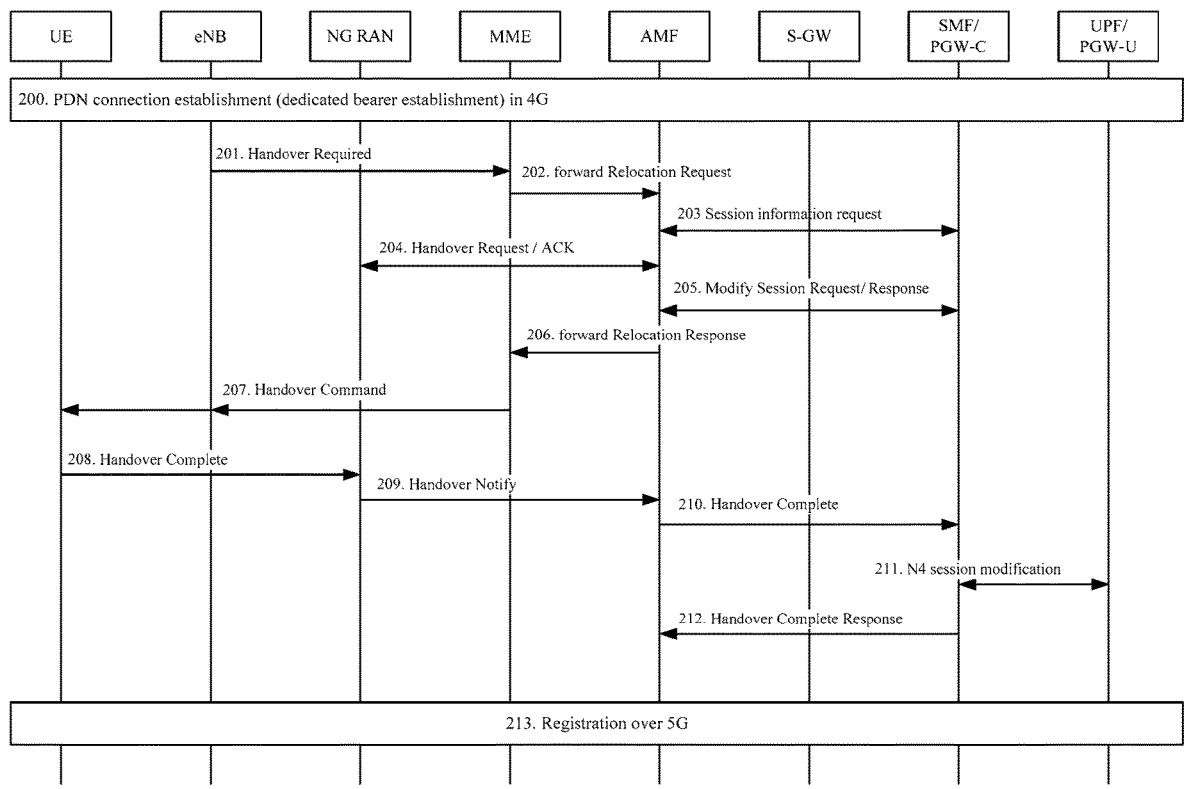
FIG. 5 is a flowchart of a handover from 4G to 5G in the related art of the present disclosure.
Figure 6:
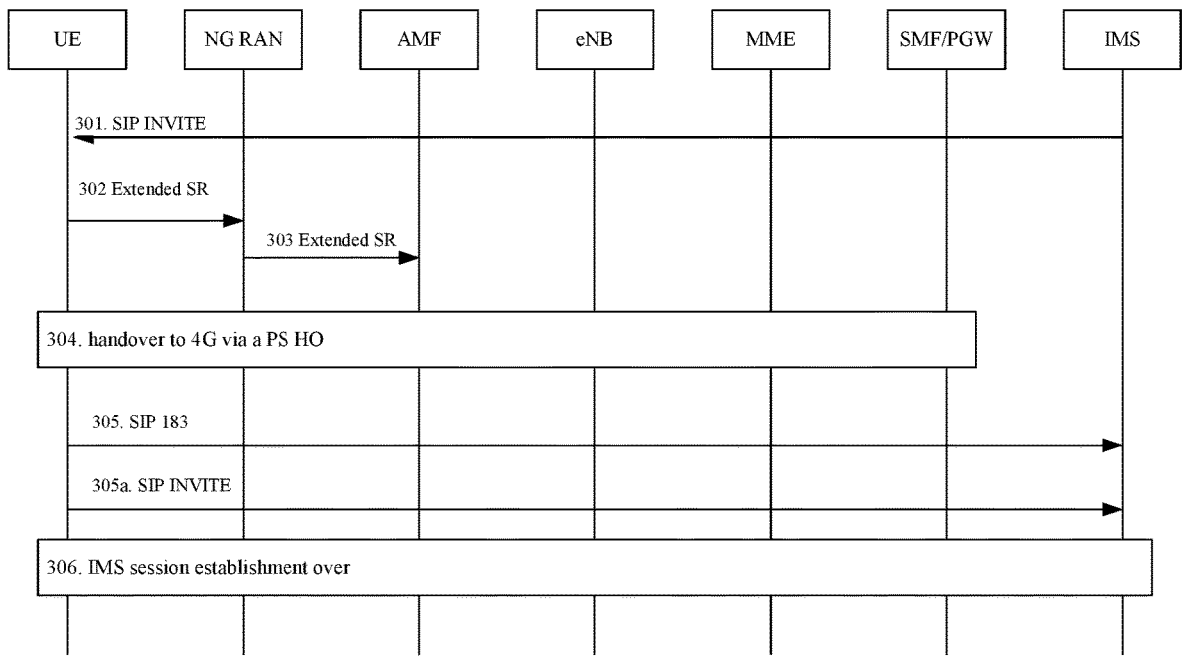
FIG. 6 is a schematic diagram of an implementation mode of a CSFB in a 3GPP system in the related art of the present disclosure.

In step 909, the UE is handed over to the 5G, and the steps in the process are the same as the steps 202 to 212 of FIG. 5.

In step 910, after the handover is completed, the UE initiates a registration process in the 5G system.

A SMF may also locally generate a QoS profile of the 5G system according to the QoS profile of the 4G system, or use the QoS profile of the 5G system provided in step 904, or may take the steps 912 and 913 described below.

In step 912, the SMF initiates a PDU-CAN session modification request to the PCF.

In step 913, the PCF returns a QoS profile of the 5G system to the SMF.

A process of a QoS flow establishment in the 5G network in the existing art includes the steps described below.

In step 914, the SMF transmits an N2 session request to the AMF, and the N2 session request carries the QoS profile.

In step 915, the AMF transmits a radio resource establishment request to the 5G RAN node.

In step 916, the 5G RAN transmits a RRC reconfiguration request to the UE.

In step 917, the UE returns a RRC reconfiguration response.

In step 918, the 5G RAN returns a radio resource establishment request response (i.e. N2 response) to the AMF.

In step 919, the AMF returns an N2 session request response to the SMF.

In step 920, the SMF returns a PDU-CAN session modification response to the PCF.

In step 921, the PCF returns a resource request response to the P-CSCF.

In step 922, the session establishment in the IMS is completed.

Embodiment 4

An embodiment of the present disclosure further provides a storage medium. Alternatively, in the embodiment, the storage medium described above may be configured to store program codes for executing the steps described below.

In step S1, a source base station connected to a UE is instructed to initiate a handover during the establishment of a traffic for the UE.

In step S2, bearer establishment or Quality of Service (QoS) flow establishment is initiated after the UE is handed over from a first access network to a second access network.

Alternatively, in the embodiment, the storage medium may include, but is not limited to, a U disk, a read-only memory (ROM), a random access memory (RAM), a mobile hard disk, a magnetic disk, an optical disk or another medium capable of storing program codes.

Alternatively, in the embodiment, a processor executes the program codes stored in the storage medium to instruct the source base station connected to the UE to initiate the handover during the establishment of the traffic for the UE.

Alternatively, in the embodiment, the processor executes the program codes stored in the storage medium to initiate the bearer establishment or the Quality of Service (QoS) flow establishment after the UE is handed over from the first access network to the second access network.

Alternatively, for specific examples in the embodiment, reference may be made to the examples described in the above embodiments and optional embodiments, and repetition will not be made in the embodiment.

An embodiment of the present disclosure further provides an electronic apparatus, including a memory and a processor, where the memory is configured to store computer programs and the processor is configured to execute the computer programs for executing the steps in any one of the method embodiments described above.

Alternatively, the electronic apparatus described above may further include a transmission device and an input/output device, where both the transmission device and the input/output device are connected to the processor described above.

Apparently, it should be understood by those skilled in the art that each of the above-mentioned modules or steps of the present disclosure may be implemented by a general-purpose computing apparatus, the modules or steps may be concentrated on a single computing apparatus or distributed on a network formed by multiple computing apparatuses, and alternatively, the modules or steps may be implemented by program codes executable by the computing apparatuses, so that modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

As described above, the network handover method, apparatus and system provided by the embodiments of the present disclosure has the following beneficial effects. The technical problem of an over-complicated handover between networks in the related art is solved, and the handover is implemented with few changes to the UE and the network. Thus, the network handover process is improved and simplified.

What is claimed is:

1. A wireless communication method, comprising:
receiving, by a base station in a next generation radio access network (NG-RAN), a session request for a session establishment of a Packet Data Unit (PDU) session for Internet Protocol multimedia subsystem (IMS) voice over an N2 interface via an access and mobility control function (AMF), the session request including information of a Quality of Service (QoS) flow associated with the session establishment, wherein the PDU session is associated with one or more QoS flows including the QoS flow, and wherein each of the one or more QoS flows comprises a QoS profile;
determining to trigger a handover of the session establishment of the PDU session for the IMS voice by the base station in the NG RAN;
transmitting, by the base station in the NG RAN in response to the determining to trigger the handover, a session response via the AMF indicating the handover of the session establishment of the PDU session for the IMS voice to a node or a network that provides Long Term Evolution (LTE) communications; and
initiating, by the base station in the NG RAN, the handover of the session establishment of the PDU session for the IMS voice to the node or the network by transmitting a handover required message to the AMF.

2. The method of claim 1, wherein the node or the network that provides LTE communications includes an LTE base station or an evolved LTE base station.

3. The method of claim 1, wherein the network element includes a session management function (SMF).

4. The method of claim 1, wherein the network element includes a packet data network gateway control plane (PGW-C).

5. A wireless communication method, comprising:
receiving, by a session management function (SMF) or a packet data network gateway control plane (PGW-C), a session response from a base station in a next generation radio access network (NG-RAN) via an access and mobility control function (AMF), wherein the session response indicates a handover of a session establishment of a Packet Data Unit (PDU) session for Internet Protocol multimedia subsystem (IMS) voice to a node or a network that provides Long Term Evolution (LTE) communications, wherein the PDU session is associated with one or more Quality of Service (QoS) flows, and wherein each of the one or more QoS flows comprises a QoS profile; and
initiating, by the session management function (SMF) or the packet data network gateway control plane (PGW-C), a bearer establishment or a QoS flow establishment after the handover is completed.

6. A wireless communication device in a next generation radio access network (NG-RAN), comprising:
a processor, and
a memory including processor executable code, wherein the processor executable code upon execution by the processor configures the processor to:
receive a session request for a session establishment of a Packet Data Unit (PDU) session for Internet Protocol multimedia subsystem (IMS) voice over an N2 interface via an access and mobility control function (AMF), the session request including information of a Quality of Service (QoS) flow associated with the session establishment, wherein the PDU session is associated with one or more QoS flows including the QoS flow, and wherein each of the one or more QoS flows comprises a QoS profile;

determine to trigger a handover of the session establishment of the PDU session for the IMS voice;

transmit, in response to the determining to trigger the handover, a session response via the AMF indicating the handover of the session establishment of the PDU session for the IMS voice to a node or a network that provides Long Term Evolution (LTE) communications; and initiate a handover of the session establishment for the IMS voice to the node or the network that provides Long Term Evolution (LTE) communications by transmitting a handover required message to the AMF.

7. The device of claim 6, wherein the node or the network that provides LTE communications includes an LTE base station or an evolved LTE base station.

8. The device of claim 6, wherein the network element includes a session management function (SMF).

9. The device of claim 6, wherein the network element includes a packet data network gateway control plane (PGW-C).

10. A wireless communication device implemented as a session management function (SMF) or a packet data network gateway control plane (PGW-C), comprising:

a processor, and a memory including processor executable code, wherein the processor executable code upon execution by the processor configures the processor to:

receiving a session response from a base station in a next generation radio access network (NG-RAN) via an access and mobility control function (AMF), wherein the session response indicates a handover of a session establishment of a Packet Data Unit (PDU) session for Internet Protocol multimedia subsystem (IMS) voice to a node or a network that provides Long Term Evolution (LTE) communications, wherein the PDU session is associated with one or more Quality of Service QoS flows, and wherein each of the one or more QoS flows comprises a QoS profile; and initiating a bearer establishment or a QoS flow establishment after the handover is completed.

11. A non-transitory storage medium having code stored thereon, the code upon execution by a processor, causing the processor to:

receive, by a base station in a next generation radio access network (NG-RAN), a session request for a session establishment of a Packet Data Unit (PDU) session for Internet Protocol multimedia subsystem (IMS) voice over an N2 interface via an access and mobility control function (AMF), the session request including information of a Quality of Service (QoS) flow associated with the session establishment, wherein the PDU session is associated with one or more QoS flows including the QoS flow, and wherein each of the one or more QoS flows comprises a QoS profile;

determine to trigger a handover of the session establishment of the PDU session for the IMS voice;

transmit, in response to the determining to trigger the handover, a session response via the AMF indicating the handover of the session establishment of the PDU session for the IMS voice to a node or a network that provides Long Term Evolution (LTE) communications; and initiate, by the base station in the NR RAN, a handover of the session establishment of the PDU session for the IMS voice to the node or the network that provides Long Term Evolution (LTE) communications by transmitting a handover required message to the AMF.

12. The non-transitory storage medium of claim 11, wherein the node or the network that provides LTE communications includes an LTE base station or an evolved LTE base station.

13. The non-transitory storage medium of claim 11, wherein the network element includes a session management function (SMF).

14. The non-transitory storage medium of claim 11, wherein the network element includes a packet data network gateway control plane (PGW-C).

15. A non-transitory storage medium having code stored thereon, the code upon execution by a processor, causing the processor to:

receive, by a session management function (SMF) or a packet data network gateway control plane (PGW-C), a session response from a base station in a next generation radio access network (NG-RAN) via an access and mobility control function (AMF), wherein the session response indicates a handover of a session establishment of a Packet Data Unit (PDU) session for Internet Protocol multimedia subsystem (IMS) voice to a node or a network that provides Long Term Evolution (LTE) communications, wherein the PDU session is associated with one or more Quality of Service (QoS) flows, and wherein each of the one or more QoS flows comprises a QoS profile; and initiate, by the session management function (SMF) or the packet data network gateway control plane (PGW-C), a bearer establishment or a QoS flow establishment after the handover is completed.

* * * * *